US008265782B2

(12) United States Patent
Hwang et al.

(10) Patent No.: US 8,265,782 B2
(45) Date of Patent: Sep. 11, 2012

(54) MOBILE DEVICE HAVING MULTI-AUDIO OUTPUT FUNCTION

(75) Inventors: Kwang-il Hwang, Suwon-si (KR); Kwon-ju Yi, Yongin-si (KR); Dong-yoon Kim, Seoul (KR); Seong-woon Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 721 days.

(21) Appl. No.: 11/504,637

(22) Filed: Aug. 16, 2006

(65) Prior Publication Data

US 2007/0078549 A1 Apr. 5, 2007

(30) Foreign Application Priority Data

Sep. 29, 2005 (KR) ........................ 10-2005-0091363

(51) Int. Cl.
*G06F 17/00* (2006.01)

(52) U.S. Cl. ........................................................ 700/94

(58) Field of Classification Search .................... 700/94; 369/1-12; 381/98-109, 119
See application file for complete search history.

(56) References Cited

U.S. PATENT DOCUMENTS

| | | | | |
|---|---|---|---|---|
| 5,608,651 | A * | 3/1997 | Leavy et al. | 348/14.12 |
| 5,703,794 | A * | 12/1997 | Heddle et al. | 700/94 |
| 5,815,689 | A * | 9/1998 | Shaw et al. | 713/400 |
| 6,332,175 | B1 * | 12/2001 | Birrell et al. | 711/112 |
| 7,126,770 | B1 * | 10/2006 | Arai et al. | 360/8 |
| 7,315,764 | B1 * | 1/2008 | Sutardja et al. | 700/94 |
| 2006/0013077 | A1 * | 1/2006 | Mesarovic et al. | 369/30.01 |

FOREIGN PATENT DOCUMENTS

| | | |
|---|---|---|
| JP | 57-178432 | 11/1982 |
| JP | 8-6584 | 1/1996 |
| JP | 10-011092 | 1/1998 |
| JP | 11-296167 | 10/1999 |
| JP | 2001-202094 | 7/2001 |
| JP | 2002-062896 | 2/2002 |
| JP | 2002-354071 | 12/2002 |
| JP | 2005-156641 | 6/2005 |
| KR | 2001-0076461 | 8/2001 |
| KR | 2001-0095712 | 11/2001 |
| KR | 10-0420666 | 2/2004 |
| KR | 10-2004-0024453 | 3/2004 |
| KR | 10-2004-0026909 | 4/2004 |
| KR | 10-2004-0052642 | 6/2004 |
| KR | 10-2005-0034096 | 4/2005 |
| KR | 10-2005-0035557 | 4/2005 |

OTHER PUBLICATIONS

Microsoft Computer Dictionary definition of FIFO, 2002.*
Japanese Office Action for corresponding Japanese Patent Application No. 2006-253836 dated Nov. 24, 2009 (3 pgs).
Japanese Office Action issued Jan. 11, 2011 in corresponding Japanese Patent Application 2006-253836.

* cited by examiner

*Primary Examiner* — Andrew C Flanders
(74) *Attorney, Agent, or Firm* — Staas & Halsey LLP

(57) ABSTRACT

A mobile device playing and outputting audio data having various formats. The mobile device includes a memory storing audio data having different formats; a plurality of audio-playing units, each having a codec that corresponds a respective format and restoring respective analog sound signals from the corresponding audio data; a processor receiving a hardware interrupt from some or all of the audio-playing units to provide corresponding data of the stored audio data to a corresponding audio playing unit; and an output unit mixing the restored analog sound signals in order to be output.

13 Claims, 4 Drawing Sheets

MOBILE DEVICE HAVING MULTI-AUDIO OUTPUT FUNCTION

CROSS-REFERENCE TO RELATED APPLICATIONS

This application claims the benefit of Korean Patent Application No. 10-2005-0091363, filed on Sep. 29, 2005 in the Korean Intellectual Property Office, the disclosure of which is incorporated herein in its entirety by reference.

BACKGROUND OF THE INVENTION

1. Field of the Invention

The present invention relates to a mobile device having an audio data playing unit, and more particularly, to a mobile device playing and outputting audio files having various formats.

2. Description of the Related Art

With the development of information technology, the information and communication environment has been rapidly changed. Mobile communication has become an essential part of most businesses. With the expansion of mobile communication services, more diverse functions have been added to mobile devices. Using the mobile device, a user can make a phone call, transmit/receive a message, store data, receive various information services such as weather and stock updates, and others, as well as use Internet services.

Further, since data storage capacities and processing speeds of microcomputers (MICOMs) are gradually increasing, the user can also listen to music using a mobile communication terminal.

Meanwhile, the size of digital image data has been gradually decreasing due to the development of MPEG technology. Accordingly, the small-sized memory used in a portable terminal can store more files.

Also, MP3 technology, which performs audio compression using MPEG technology to produce smaller amounts of digital data, has been used. With the spread of MP3 music, an MP3 player including a unit for storing MP3 data and a unit for playing the stored MP3 data, and a mobile phone equipped with the MP3 player have become widespread. As a result, the user can listen to MP3 music while being mobile.

Further, the user can listen to MP3 music using an MP3 handset included with a mobile communication terminal, the unit for storing MP3 data, and the unit for playing the stored MP3 data.

Various digital audio storage formats, such as WAV (wave), WMA (windows media audio), MIDI (Music Instrument Digital Interface), ra (Real Audio), and others are in use.

FIG. 1 is a block diagram illustrating the features of an apparatus for controlling a sound signal, which is disclosed in Korean Patent Registration No. 469919.

Referring to FIG. 1, an MP3 handset includes an MSM 101 for performing a main control function of a microprocessor, a microphone 103 for inputting a voice signal, a speaker 104 for outputting the voice signal, a codec 102 located between the MSM 101 and the microphone 103 and the speaker 104 for transforming data, a Multi Media Card (MMC) 109 for storing MP3 music data, a MICOM 105 for playing MP3 music data stored in the MMC, a decoder 106 for decoding a digital audio signal of the MP3 music data output from the MICOM 105, a digital to analog converter 107 for converting the decoded digital audio signal into an analog audio signal, and an ear jack 108 to receive ear phones in order to listen to the converted analog audio signal.

An operation of the above-described MP3 handset will be now described.

When a caller speaks into the handset, a voice signal is input through the microphone 103. The input voice signal is coded by the codec 102, and transmitted to the MSM 101. The MSM 101 receives the transmitted voice signal, and then encodes and compresses the received voice signal. The encoded compressed voice signal is transmitted via a transmitter (not shown).

Further, when the caller speaks with another party via the handset, a voice signal received from the other party is decoded and decompressed by the MSM 101. If the decompressed voice signal is transmitted to the codec 102, the codec 102 receives the transmitted voice signal and decodes the received voice signal. The decoded voice signal is output through the speaker 104.

Further, when MP3 music data is played on the MP3 handset, the MICOM 105 reads corresponding music data from the multi media card 109 where the MP3 music data is stored, and transmits a digital audio signal corresponding to the read music data to the decoder 106. Then, the decoder 106 decodes the transmitted digital audio signal. The decoded digital audio signal is converted into an analog audio signal by the D/A converter 107 in order to be output through the audio jack 108. A user of the MP3 handset can listen to MP3 music through earphones (not shown) plugged in the ear jack 108.

Meanwhile, when a background-music function is executed by the user, the user plays MP3 music data, and can simultaneously transmit the played MP3 music data to the other party. At this time, if the MICOM 105 transmits the digital music data read from the multi media card 109 to the decoder 106, the decoder 106 decodes the digital music data and transmits the decoded digital music data to the D/A converter 107. The D/A converter 107 converts MP3 music data transmitted from the decoder 106 to analog music data under the control of the MICOM 105, and transmits the analog music data to the codec 102.

The codec 102 mixes the analog music data transmitted from the D/A converter 107, and the voice signal input via the microphone 103. The mixed analog voice signal is converted into digital data in order to be transmitted via the MSM 101. If the above-described processes are performed in reverse order on the other party's handset, the other party can listen to the transmitted MP3 music while hearing the caller's voice. Therefore, the caller can talk over the handset while listening to MP3 music together with the called party.

In the conventional MP3 handset, the voice signal and a predetermined sound source are mixed by the user's operation in order to provide the mixed voice signal to the other party. However, the user can only listen to one sound source (one format). Methods and apparatuses for simultaneously playing and controlling various formats of sound sources have not been disclosed.

Recently, requests from various consumers to be able to play sound sources of different formats have been increasing. However, it is difficult to enable the conventional MP3 handset to satisfy the requests. Accordingly, a need for a technology that enables the user to freely play and control various formats of sound sources has increased.

SUMMARY OF THE INVENTION

Accordingly, it is an aspect of the present invention to solve the above-mentioned problems occurring in the related art.

It is another aspect of the present invention to provide an apparatus and a method of simultaneously mixing and playing various formats of sound sources by a simple operation performed by a user.

Additional aspects and/or advantages of the invention will be set forth in part in the description which follows and, in part, will be apparent from the description, or may be learned by practice of the invention.

The foregoing and/or other aspects are achieved by providing a mobile device which includes a memory storing different formats of audio data; a plurality of audio-playing units, a codec respectively corresponding to the one of the different formats of the stored audio data, restoring respective analog sound signals from the corresponding audio data; a processor receiving a hardware interrupt from at least one of the plurality of audio-playing units; and an output unit outputting by mixing the restored analog sound signals.

BRIEF DESCRIPTION OF THE DRAWINGS

These and/or other aspects and advantages of the invention will become apparent and more readily appreciated from the following description of the embodiment, taken in conjunction with the accompanying drawings of which.

DETAILED DESCRIPTION OF THE PREFERRED EMBODIMENT

Figure 1:
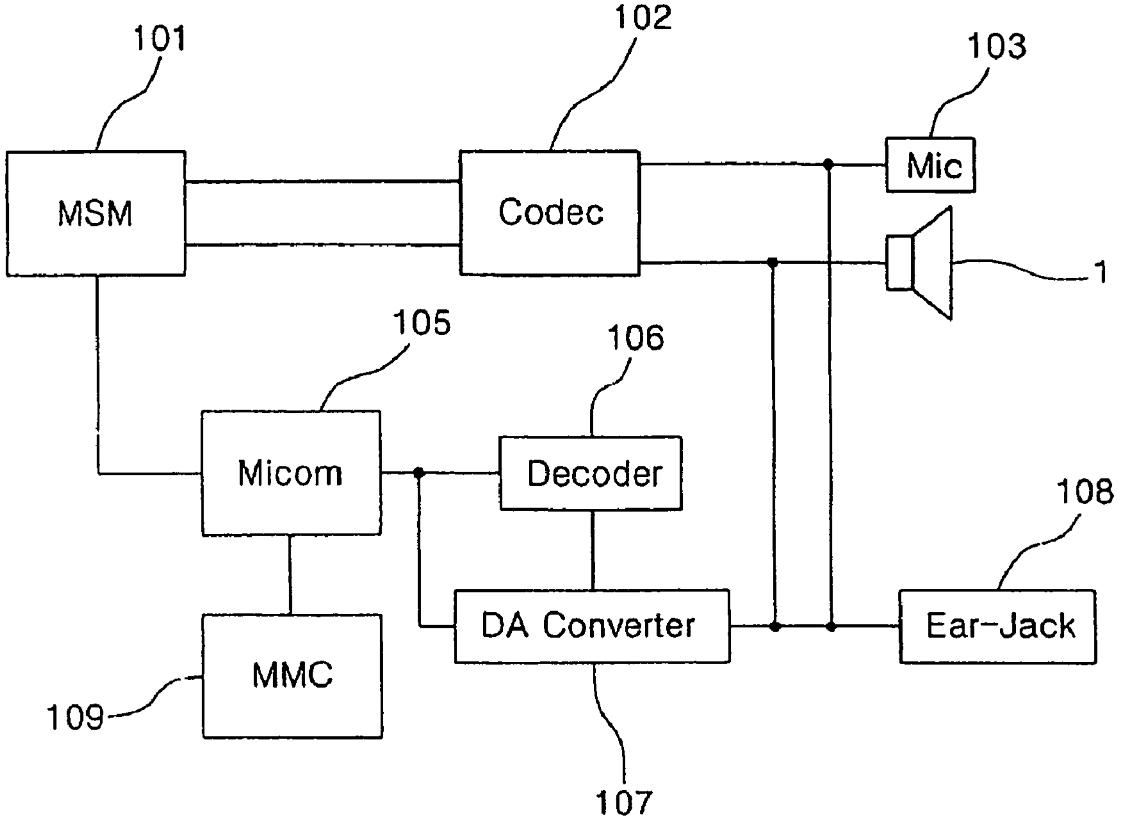
FIG. 1 is a block diagram illustrating the construction of a conventional sound signal controlling apparatus.

Reference will now be made in detail to the embodiment of the present invention, an example of which is illustrated in the accompanying drawings, wherein like reference numerals refer to the like elements throughout. The embodiment is described below to explain the present invention by referring to the figures.

The present invention is not limited to the embodiment disclosed hereinafter, but can be implemented in diverse forms. The matters defined in the description, such as the detailed construction and elements, are examples provided to assist those of ordinary skill in the art in a comprehensive understanding of the invention and is not limiting.

Figure 2:
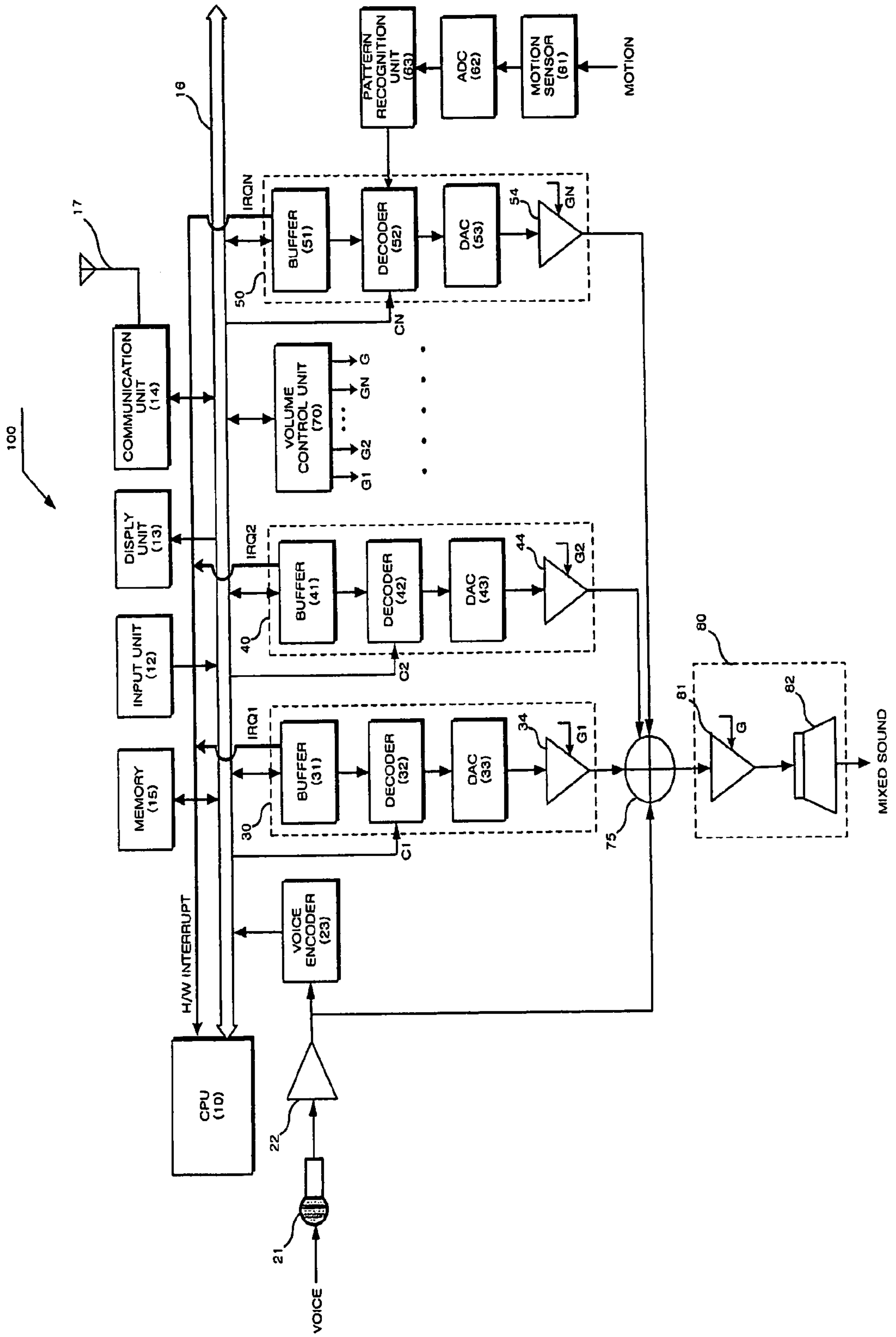
FIG. 2 is a block diagram illustrating the construction of a mobile device according to an embodiment of the present invention.

FIG. 2 is a block diagram illustrating the construction of a mobile device 100 according to an embodiment of the present invention. The mobile device 100 could be a mobile phone, a Personal Digital Assistant (PDA), a camcorder, or various other portable devices.

The mobile device 100 may include a display unit 13 displaying various information (for example, a present state of the mobile device 100) to a user. The display unit 13 may include an LCD, an LED, or other displays, on the outside thereof, and an input unit receiving commands from the user through an input device such as a keyboard, a mouse, a pen, a digitizer, and other input devices.

Components of the mobile device 100 may be electrically connected through a CPU 10, a memory 15 and a system bus 16. The memory 15 may be implemented in either a read only memory (ROM) storing a program executed by the CPU 10 or a random access memory (RAM), which has a battery backup, for storing various data. The memory 15 may be also implemented as a flash memory or a hard disk, all of which can be written to and read from, and can store data even when power is absent. The memory 15 stores at least one or more audio files.

An input unit 12 receives a command from the user, and then converts the command to an electrical signal. The display unit 13 may be implemented by various light emitting devices such as an LCD, LED, and others. The mobile device 100 may further include a communication unit 14 and an antenna 17 performing sound communication and data communication, which may be a mobile phone and a wireless LAN device, respectively.

The communication unit 14 is connected to the antenna 17 in order to transmit input signals and data modulated by a carrier through the antenna 17, and receive and demodulate the input signals and data from the antenna 17.

A microphone 21 converts an input voice signal to an analog voice signal. The converted voice signal is amplified through an amplifier 22. The amplified signal is input to a voice encoder 23 and a mixer 75. The voice encoder 23 converts the amplified signal to digital data, compresses the digital data, and sends the compressed digital data to the communication unit 14.

The mobile device 100 includes a plurality of audio-playing units 30, 40, and 50, to enable a plurality of audio data to be played or controlled. The audio-playing units 30, 40, and 50 include a plurality of buffers 31, 41, and 51, a plurality of decoders 32, 42, and 52, a plurality of DACs 33, 43, and 53, and a plurality of amplifiers 34, 44, and 54.

Operation of the components of the audio-playing unit 30 will be explained as follows. First, the buffer 31 receives audio data stored in the memory 15, and temporarily stores the received audio data. An IRQ generating unit (not shown) generates interrupt requests (IRQs) according to an amount of data remaining in the buffer 31, and then transfers the IRQs to the CPU 10 via a separate signal line (other than the system bus 16) as an H/W interrupt. According to the plurality of IRQs, the CPU 10 receives the IRQs, provides audio data that corresponds to the IRQs among audio data stored in the memory 15, and transfers control signals C1, C2, and CN to the decoders 32, 42 and 52.

The decoder 32 decodes the audio data temporarily stored in the buffer 31 according to the control signal C1, and then converts the decoded audio data to raw audio data, for example, pulse code modulation (PCM) data. The buffer 31 may store the data according to a First-In, First-Out (FIFO) algorithm. The decoder 32 may include various codecs.

The DAC 33 is a digital to analog (D/A) converter that converts raw audio data to an analog sound signal. The amplifier 34 amplifies the analog sound signal based on a gain control signal (G1) provided by a volume control unit 70.

Audio-playing units 40 and 50, other than the audio playing unit 30, generate a gain-controlled analog sound signal from corresponding audio data and output the generated signal to the mixer 75. The audio-playing unit 50 is a component outputting a beat-box sound according to motion recognition, and restores a corresponding beat-box sound depending on signals transferred by a pattern recognition unit 63.

In order to perform the motion recognition, a motion sensor 61 senses motion of the mobile device 100 in order to output a sensor signal value corresponding to the sensed movement. The motion sensor 61 may include an acceleration sensor, an angular velocity sensor, a terrestrial magnetism sensor, or other various sensors, or a combination thereof, according to the field of application. The angular velocity sensor senses the angular velocity of the sound generation unit, i.e., whether the mobile device has moved left/right, up/down, or clockwise/ counter-clockwise, and generates a sensor signal value that corresponds to the sensed angular velocity. The angular velocity of the sound generation unit can be recognized by the angular velocity sensor. The acceleration sensor senses the acceleration of the mobile device, i.e., the change in velocity of the mobile device, and generates a sensor signal value that corresponds to the sensed acceleration.

Figure 3:
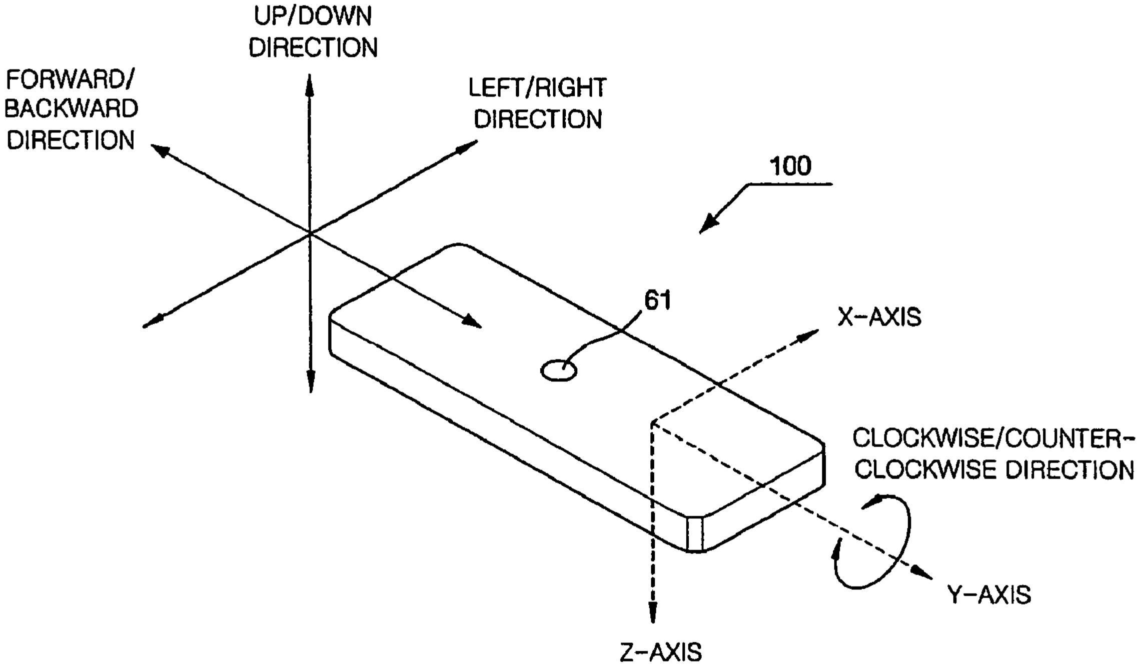
FIG. 3 is a view illustrating a type of movement that a motion sensor can sense.

The sensor signal from the motion sensor 61 is an analog signal that corresponds to an angular velocity value or an acceleration value of the mobile device based on the movement. An ADC 62 converts the analog sensor signal to a digital sensor signal. The digital sensor signal converted by the ADC 62 is provided to the pattern recognition unit 63. The pattern recognition unit 63 analyzes a motion pattern of the mobile device using the provided digital sensor signal. The movement pattern can be classified into six patterns: x-axis movement, y-axis movement, z-axis movement, x-axis rotation, y-axis rotation, z-axis rotation, all of which can respectively correspond to different beat-box sounds, as shown in FIG. 3.

Consequently, when the pattern recognition unit 63 instructs the decoder 52 to play a beat-box sound that corresponds to the recognized motion as a control signal, the decoder 52 temporarily stores the corresponding beat-box sound in the buffer 51 according to the instruction, and then plays the stored beat-box sound. The beat-box sound is audio data representing an imitated sound, and is saved in audio file formats such as MP3, WAV, WMA, or others.

The mobile device 100 may include the audio-playing units 30, 40, and 50, as well as audio data stored in the memory 15.

The mixer 75 mixes analog sound signals output from the audio-playing units 30, 40, and 50. The mixer 75 can also mix the analog voice signal amplified by the amplifier 22 with the output analog sound signals.

When the analog voice signal is mixed, the user can insert his or her voice during playing of the audio sound. For example, the beat sound is inserted during playing of background music, and simultaneously the user's voice may be output or recorded together with the background music. Since various conventional algorithms are well known methods that the mixer 75 can use to mix a plurality of analog signals, an explanation thereof will be omitted.

Sound (hereinafter, referred to as "mixed sound") mixed by the mixer 75 may be output to the user through an audio output unit 80. The audio output unit 80 includes an amplifier 81 controlling a gain according to a main gain control signal (G) that is provided by a volume control unit 70, and a speaker 82 converting the input electrical sound signal to an actual sound.

The volume control unit 70 provides the control signals (G1, G2, . . . , GN) to each of the amplifiers 34, 44, and 54, where the control signals (G1, G2, . . . , GN) control gains of the amplifier 34, 44, and 54 included in the respective audio playing unit 30, 40, and 50. Further, the control signal (G) controlling the gain of the amplifier 81 in the audio output unit 80 is provided to the amplifier 81.

The control signals (G1, G2, . . . , CN) can control the magnitude of an output volume according to the type of audio that is played by the respective media-playing unit 30, 40, and 50. The control signal (G) can control the output volume of the mixed sound, i.e., the magnitude of the main volume.

Figure 4:
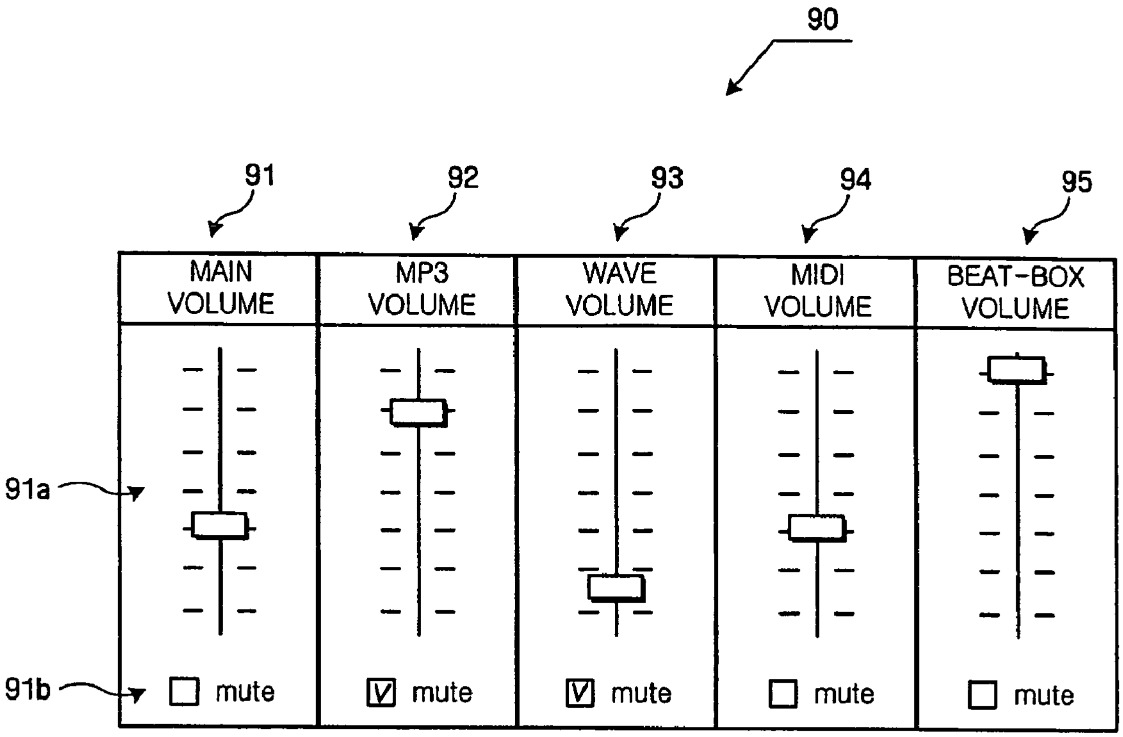
FIG. 4 is a view illustrating a volume control interface according to the embodiment of the present invention.

FIG. 4 shows an example of displaying a volume control interface 90, which is provided to the user, on the display unit 13.

The volume control interface 90 includes a main volume section 91, and a plurality of volume sections 92, 93, 94, and 95 according to the type of audio data. The main volume section 91 may include a control bar 91*a* controlling the main volume using a predetermined input unit that is provided from the input unit 12, and a mute check box 91*b*, which is a "toggle" type. Likewise, the other volume sections 92, 93, 94, and 95 may also include the control bar 91*a* and the mute check box.

In FIG. 2, as an example, the audio-playing unit 30 plays MP3 files, the audio-playing unit 40 plays WAV files, and the audio-playing unit 50 plays beat-box files that become a predetermined file type or raw audio data. In this case, if the user controls the control bar 91*a* of the main volume, the input signal is input to the system bus 16 through the input unit 12, and the volume control unit 70 connected to the system bus 16 transfers the main volume control signal (G) to the amplifier 81, so that the main volume control signal (G) can have a gain that enables the amplifier 81 to correspond to the magnitude of the controlled volume. If the user checks the mute check box 91*b*, the volume control unit 70 transfers the main volume control signal (G) to the amplifier 81, so that the gain becomes "0".

Likewise, the volume control unit 70 can control the MP3 volume by providing the amplifier 34 with the volume control signal (G1) that corresponds to commands from the users, can control WAV volume by providing the amplifier 44 with the volume control signal (G2), and can control the beat-box volume by providing the amplifier 54 with the volume control signal (GN).

As described above, according to the embodiment of the present invention, the user can not only simultaneously play various types of audio data, but also control volume according to the respective audio data at any time, even during the playing of the audio data, or control the volume of the audio data, thereby allowing the preferences of various users to be satisfied. For example, it is possible to instantly mute the background music and combine the beat-box with the user's voice, while mixing and outputting the user's voice with the background music produced by the playing of the MP3 files.

In the embodiment of the present invention, logic blocks, modules and circuits, as used in FIG. 2, may be implemented in or performed by a general purpose processor, a Digital Signal Processor (DSP), an Application Specific Integrated Circuit (ASIC), a Field Programmable Gate Array (FPGA), or other programmable logic device, a discrete gate or a transistor logic device, discrete hardware components, or any combination thereof, which performs specific functions. The general purpose processor may be a microprocessor, conventional processor, controller, microcontroller, or a state machine. The general purpose processor may be also implemented in combination with computing apparatuses, for example, combination of the DSP and the microprocessor, a plurality of microprocessors, one or more microprocessors related to a DSP core, or any other constituent.

As described above, the embodiment of the present invention can play or control various types of audio data stored in the mobile device according to the user's preference. Accordingly, the user can break from listening to fixed music, and generate his or her own music with sound effects.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A mobile device comprising:

a memory storing audio data having different formats;

a plurality of audio-playing units, each of the audio-playing units comprising a codec that respectively corresponds to one of the different formats of the stored audio data, restoring respective analog sound signals of the same data format from the corresponding audio data;

a processor receiving a hardware interrupt from at least one of the audio-playing units to provide corresponding data of the stored audio data to a corresponding audio-playing unit; and an output unit mixing at least two of the restored analog sound signals in order to output the signals together, wherein the outputted at least two analog sound signals have been generated by restoration of audio data of different formats, the audio-playing units each further comprise a buffer receiving a portion of the audio data stored in the memory to temporarily store the received audio data;

a decoder decoding the stored received audio data to create raw audio data, the raw audio data being Pulse Code Modulation (PCM) data; and a digital to analog converter converting the raw audio data to the respective analog sound signal.

2. The mobile device of claim 1, wherein the formats include at least one of MP3, WAV, WMA, or ra.

3. The mobile device of claim 1, wherein the buffer stores the data according to a First-In First-Out (FIFO) algorithm.

4. The mobile device of claim 1, wherein the audio-playing unit further comprises a unit creating an IRQ according to an amount of data remaining in the buffer.

5. The mobile device of claim 1, wherein the audio playing unit further comprises an amplifier amplifying the analog sound signal according to a predetermined control signal.

6. A mobile device comprising:

a memory storing audio data having different formats;

a plurality of audio-playing units, each of the audio-playing units comprising a codec that respectively corresponds to one of the different formats of the stored audio data, restoring respective analog sound signals from the corresponding audio data;

a processor receiving a hardware interrupt from at least one of the audio-playing units to provide corresponding data of the stored audio data to a corresponding audio-playing unit; and an output unit mixing the restored analog sound signals in order to output the signals, wherein the audio-playing units each further comprise a buffer receiving a portion of the audio data stored in the memory to temporarily store the received audio data;

a decoder decoding the stored received audio data to create raw audio data, the raw audio data being Pulse Code Modulation (PCM) data; and a digital to analog converter converting the raw audio data to the respective analog sound signal, wherein the audio playing unit further comprises an amplifier amplifying the analog sound signal according to a predetermined control signal, wherein the output unit comprises an amplifier controlling a gain of the amplified analog sound signal according to a predetermined main gain control signal; and a speaker converting the gain controlled sound signal to a physical sound.

7. The mobile device of claim 6, further comprising a volume control unit providing a control signal controlling the gain of the amplifier included in the respective audio playing unit, and the main gain control signal controlling the gain of the amplifier of the output unit.

8. The mobile device of claim 7, wherein the volume control unit comprises a volume control interface and the volume control unit creates the gain control signal controlling the gain of the amplifier included in the respective audio playing unit according to a command input by the user via the volume control interface.

9. The mobile device of claim 8, wherein the volume control interface comprises:

a main volume section enabling the user to control a main volume; and a volume section enabling volumes respectively corresponding to the plurality of audio-playing units to be controlled.

10. The mobile device of claim 9, wherein the main volume section and the volume section each comprise a control bar enabling the respective volume to be controlled, and a mute check box enabling the respective volume to be muted.

11. The mobile device of claim 1, wherein the audio-playing unit corresponding to the motion sensor generates a beat box sound.

12. A method comprising:

storing audio data having different formats in a memory of a mobile device;

restoring respective analog sound signals of the same data format from the stored audio data comprising using a plurality of audio playing units each respectively corresponding to one of the different formats;

generating a hardware interrupt to provide corresponding data of the stored audio data to a corresponding one of the audio playing units;

mixing the at least two restored analog sound signals and outputting the mixed signals together; and generating the outputted at least two analog sound signals comprising restoring audio data of different formats, wherein the restoring further comprises receiving a portion of the audio data stored in the memory to temporarily store the received audio data in a buffer;

decoding the stored received audio data to create raw audio data, the raw audio data being Pulse Code Modulation (PCM) data by a decoder; and converting the raw audio data to the respective analog sound signal by a digital to analog converter.

13. The mobile device of claim 11, wherein the beat box sound is mixed with the restored analog sound signals.

* * * * *